US005505227A

United States Patent [19]
Pubben

[11] Patent Number: 5,505,227
[45] Date of Patent: Apr. 9, 1996

[54] FAUCET CONTROL DEVICE

[76] Inventor: Peter A. Pubben, 20 Bedwood Road, N.E., Calgary, AB, Canada, T3K 2K4

[21] Appl. No.: 298,417

[22] Filed: Aug. 30, 1994

[30] Foreign Application Priority Data

Nov. 22, 1993 [CA] Canada ......................... 2109684

[51] Int. Cl.$^6$ ................................... F16K 11/18
[52] U.S. Cl. ............................ 137/607; 251/25
[58] Field of Search ........................ 137/607, 601; 251/25

[56] References Cited

U.S. PATENT DOCUMENTS

| 1,496,391 | 6/1924 | Thomas | 251/25 |
| 1,584,407 | 5/1926 | Thomas | 251/25 |
| 2,180,320 | 11/1939 | Hansen | 251/25 |
| 4,189,792 | 2/1980 | Veach | 137/607 |
| 5,111,846 | 5/1992 | Hochstrasser et al. | 137/607 |
| 5,181,538 | 1/1993 | Manganaro | 137/607 |
| 5,230,365 | 7/1993 | Woltz et al. | 137/607 |

Primary Examiner—Stephen M. Hepperle
Attorney, Agent, or Firm—Andrus, Sceales, Starke & Sawall

[57] ABSTRACT

A faucet control device to provide asepsis and conservation of water consisting of a diaphragm valve block connected inline between the hot and cold water supply and faucet. Pilot hot and cold water pressure from said valve block is routed through three flexible conduit assemblies to a three-way valve remotely located to facilitate operation by knee, foot or elbow. The application of force to the three way valves cycles the diaphragm valve block from the closed to open position while preventing crossflow between the hot and cold water supplies.

18 Claims, 7 Drawing Sheets

FAUCET CONTROL DEVICE

This invention relates to the control of cold and hot water flowing through a faucet by a method other than hand operation.

It has been amply demonstrated by a variety of studies and research that conventional hand operated faucets are a source of wasted water and energy and a cross contamination point for the spread of infectious diseases. Several devices have been developed and marketed to overcome these problems but all have some disadvantages. Mechanical foot pedal or knee operated faucets are expensive and often require extensive and costly modifications to plumbing and cabinetry. Infra-red sensor electrically operated faucets are costly to install, require an electrical outlet, may be erratic in operation and may permit cold and hot water cross flow. Foot pedal valves controlling the application of air pressure to water controlling valves are expensive and often difficult to install and require a compressed air source. Some devices attach to the spout of the faucet and although easily installed, they connect the cold and hot water supplies together, thereby permitting cross flow between them. Of these, ultrasound sensor electrically operated valves require batteries and are too bulky to comfortably adapt to many faucets. Other types operate by a foot control supplying fluid pressure through flexible tubings connected to a spout mounted valve. These tend to be untidy and cumbersome to operate. Examples of such devices are described and illustrated in U.S. Pat. No. 5,029,806, dated Jul. 9, 1991 granted to Chaung for a "Foot-Controlled Water Faucet"; in U.S. Pat. No. 4,052,035, dated Oct. 4, 1977, granted to Kenny and Armstrong for a "Remotely-Controlled Valve" and in U.S. Pat. No. 3,536,294, dated Oct. 27, 1970, granted to Rodrigues for a "Foot-Operated Control Valve Attachment Device for Water Faucets".

It is desirable to have a water control device which employs supply water pressure for control, is easily installed, simple in construction, reliable, economical and has the ability to convert existing hot and cold water outlets of any style, in any facility to other than hand operation. The present invention, now provides a water outlet control assembly which substantially overcomes the disadvantages of the aforementioned devices.

Accordingly the present invention provides a water outlet control assembly for control of water flow to a water outlet such as a faucet or spout by other than hand operation. The control assembly includes a control block connected between a pressurized water source preferably a hot water and a cold water source and the control block managing the flow of pressurized water to the water outlet depending on a pilot water pressure supplied thereto, and a pilot pressure control means connected to the control block by appropriate conduits, whereby the pilot pressure control means is selectively operable for example by a knee, foot or elbow.

In the preferred embodiment of the control block, hot and cold water flow is respectively controlled by a diaphragm gate valve preferably constructed similar to the one disclosed in U.S. Pat. No. 3,638,310 issued Feb. 1, 1972, to Austin for a "Dental Handpiece Control" and used in the control of air and water in dental drilling equipment. In the preferred embodiment a three way valve is associated with the control block and the application of pressurized pilot or operating water concurrently to the chambers of the diaphragm gate valves closes the valves and blocks cold and hot water from flowing to the water outlet. The operation of the three-way valve allows the pilot water pressure to vent to atmosphere from the chambers of the diaphragm gate valves by way of the water outlet whereby hot and cold water are allowed to pass through to the water outlet.

In another preferred aspect of the invention, pilot water pressure is supplied within the control block from upstream of the diaphragm gate valves and combined from both the cold and hot water sources to assure closure of the diaphragm gate valves.

In a further preferred aspect of the invention pilot water pressure is vented into both main hot and cold water outlet ports of the control block to assure opening of the diaphragm gate valves provided that either the hot or cold valve of the faucet is set open.

In still another preferred aspect of the invention, the control block features a pair of one-way valves respectively located in the pilot water supply path from the main cold and hot water inlet ports of the control block to prevent cross flow between the cold and hot water pressurized sources.

In yet another preferred aspect of the invention, the control block features a pair of one way valves respectively located in the pilot water exhaust path leading to the main cold and hot water outlet ports of the control block to prevent water cross flow between them.

In still a further preferred aspect of the invention the control block includes a plurality of outlet or inlet ports rather than a single port for each of the diaphragm gate valves to enhance their operation by distributing control circuit water pressure acting upon the diaphragm over several outlet or inlet orifices rather than one, thereby increasing the pressure and flow ratings of the valve.

In another preferred aspect of the invention the control block features filter elements respectively located in the pilot water supply path from the main cold and hot water inlet ports to prevent fouling of the elements in the pilot water circuit by water born pollutants and debris.

Preferred embodiments of the invention will be described in the following with reference to the drawings in which.

Figure 1:
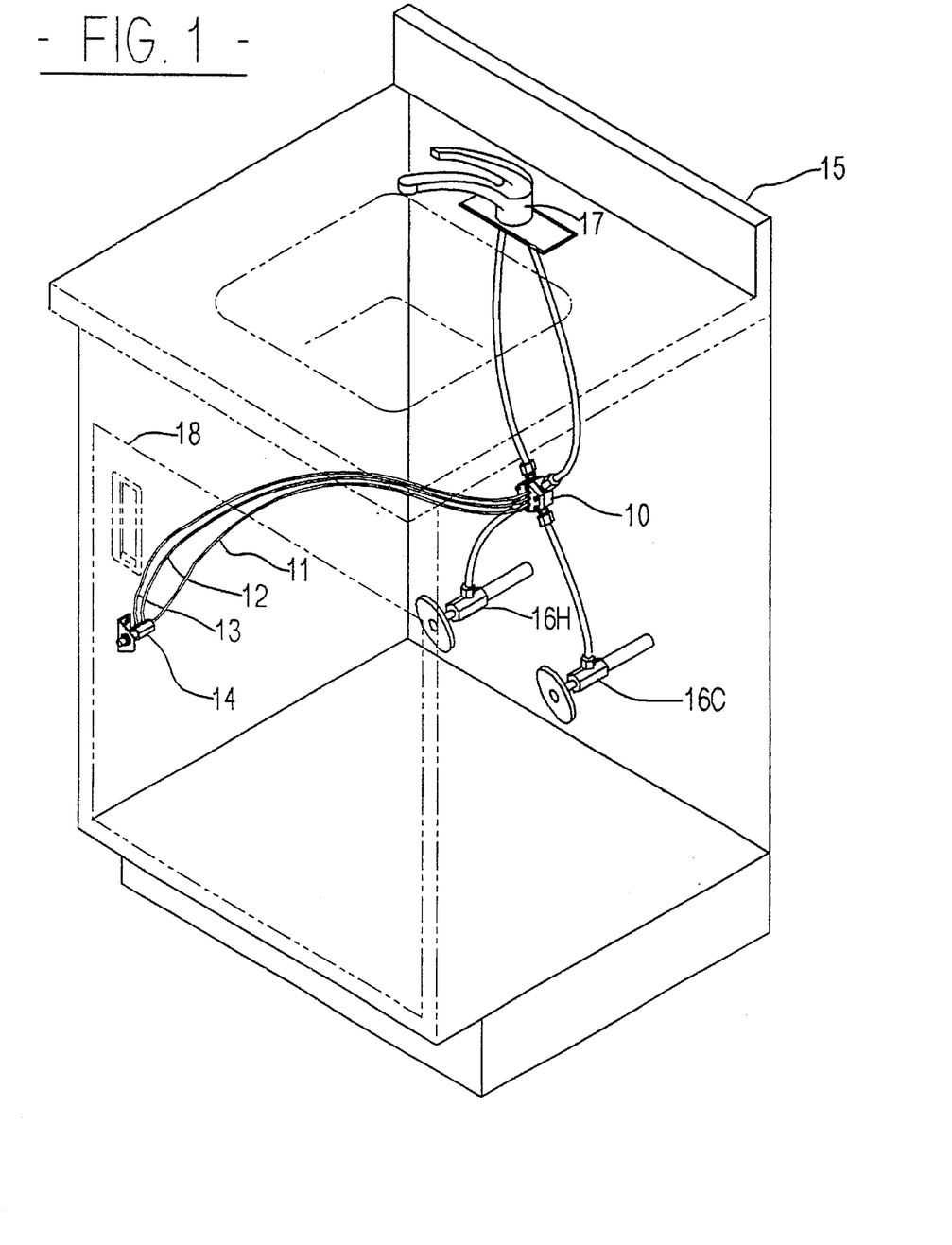
FIG. 1 is a perspective view of typical faucet, sink and cabinet arrangement incorporating the faucet control device.

FIG. 1 shows the preferred embodiment of the faucet control assembly consisting of a control block 10, a flexible pilot water supply conduit 11, flexible pilot water exhaust conduits 12 and 13 and a three way valve 14 in a typical sink cabinet arrangement 15. The control block assembly 10 connects by known adapting conduits between a pressurized cold water source 16C, a pressurized hot water source 16H and a faucet 17. Flexible conduits 11, 12 and 13 connect the control block 10 to the three-way valve 14 which controls operation of the control block and is mounted in such a manner as to set the cabinet door 18 sufficiently ajar to permit operation of the three way valve 14 with the application of force to the cabinet door by a knee or leg.

Figure 2:
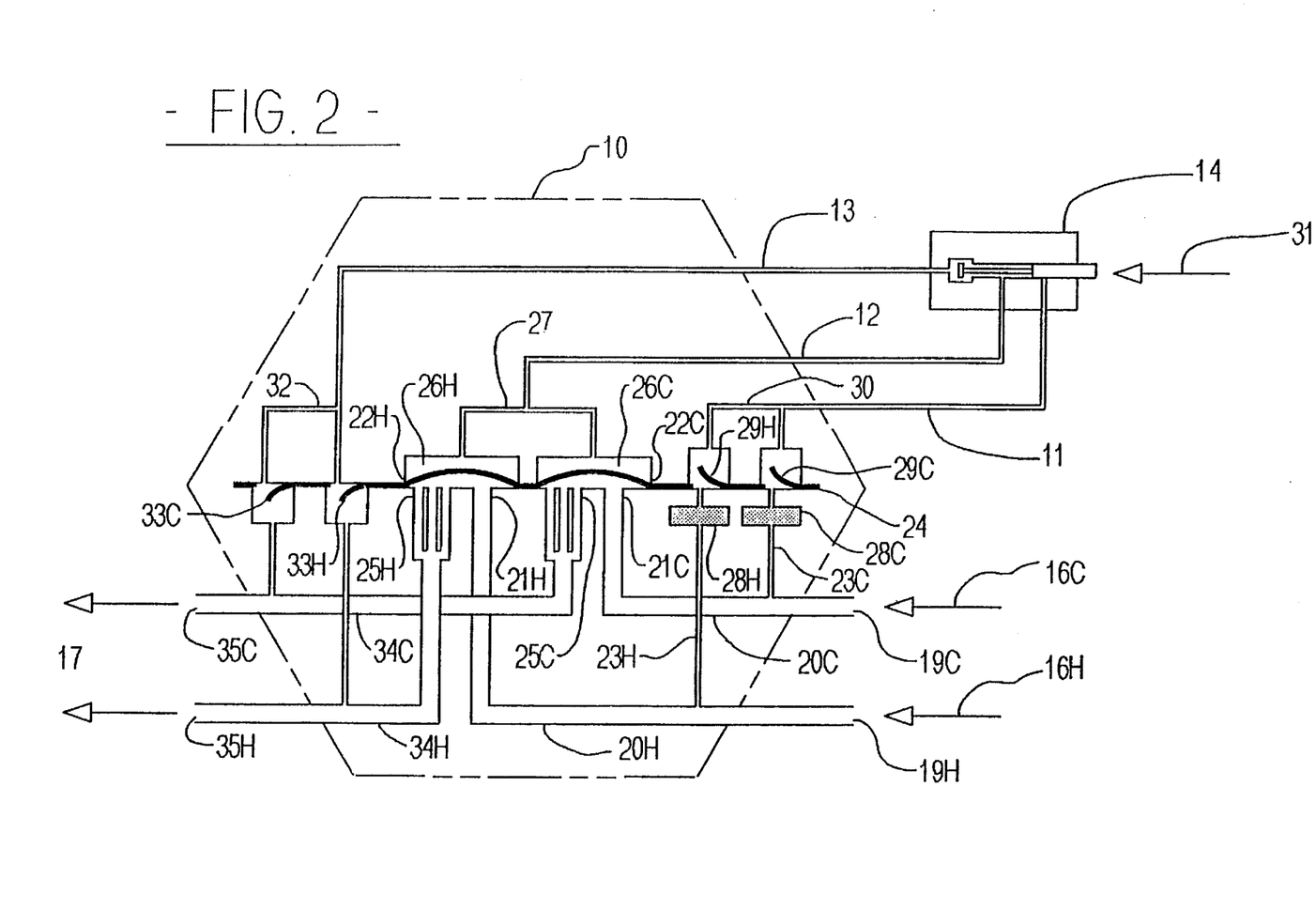
FIG. 2 is a schematic representation of the control assembly of the present invention.

FIG. 2 shows schematically the control of the cold water 16C and hot water 16H supply by the preferred faucet control assembly. The elements of the cold water circuit which are identical in construction and interchangeable with those of the hot water circuit are accorded the same numerical references followed by the corresponding letter "C" or "H". Pressurized water from the pressurized water supplies 16C and 16H enter the control block 10 through main inlet ports 19C and 19H, and flows through manifolds 20C and 20H directly to inlet ports 21C and 21H of diaphragm gate valves 22C and 22H and pilot pressure ports 23C and 23H.

Figure 3:
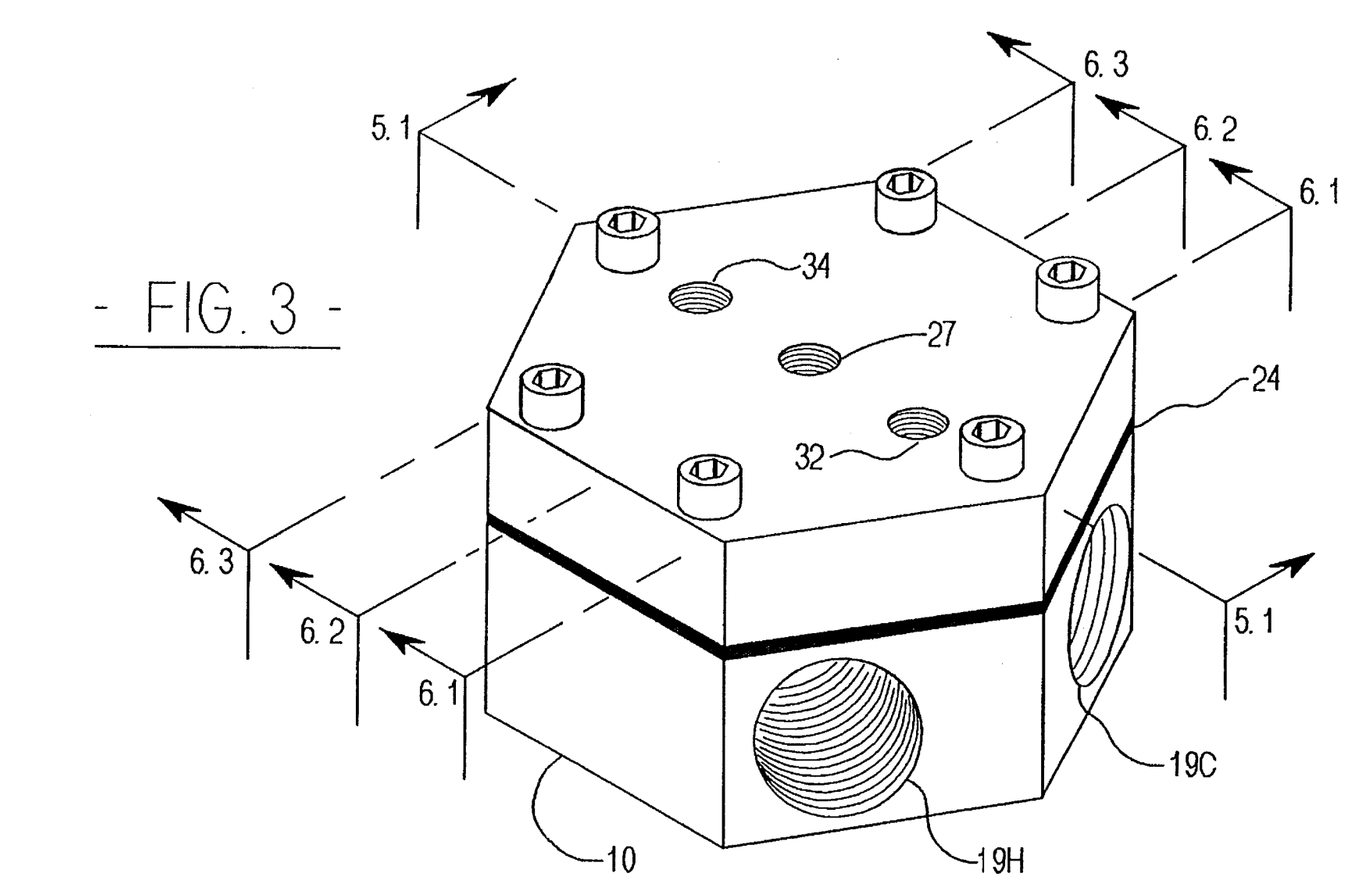
FIG. 3 is a perspective view of the diaphragm valve control block.
Figure 4:
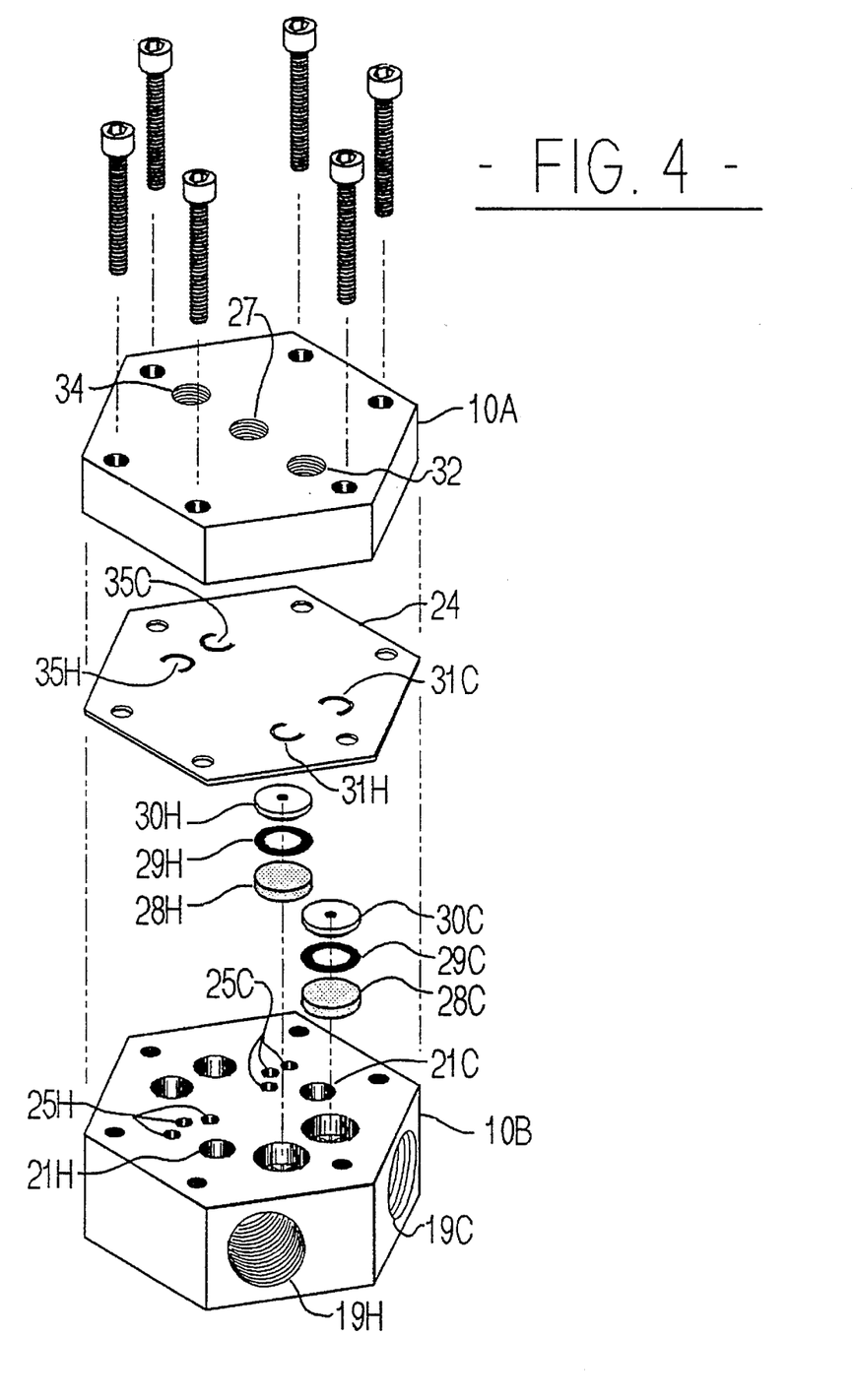
FIG. 4 is an exploded perspective view of the diaphragm valve control block.

The control block assembly 10 as shown in FIGS. 3 and 4 consists of a cover block 10A and a main body 10B and when assembled they retain filter elements 28C and 28H, o-ring seals 29C and 29H, port washers 30C and 30H and a diaphragm 24 constructed of a flexibly resilient material, common to both diaphragm gate valves 22C and 22H (see also FIG. 2) and one way valves 31C, 31H, 35C and 35H.

Figure 5:
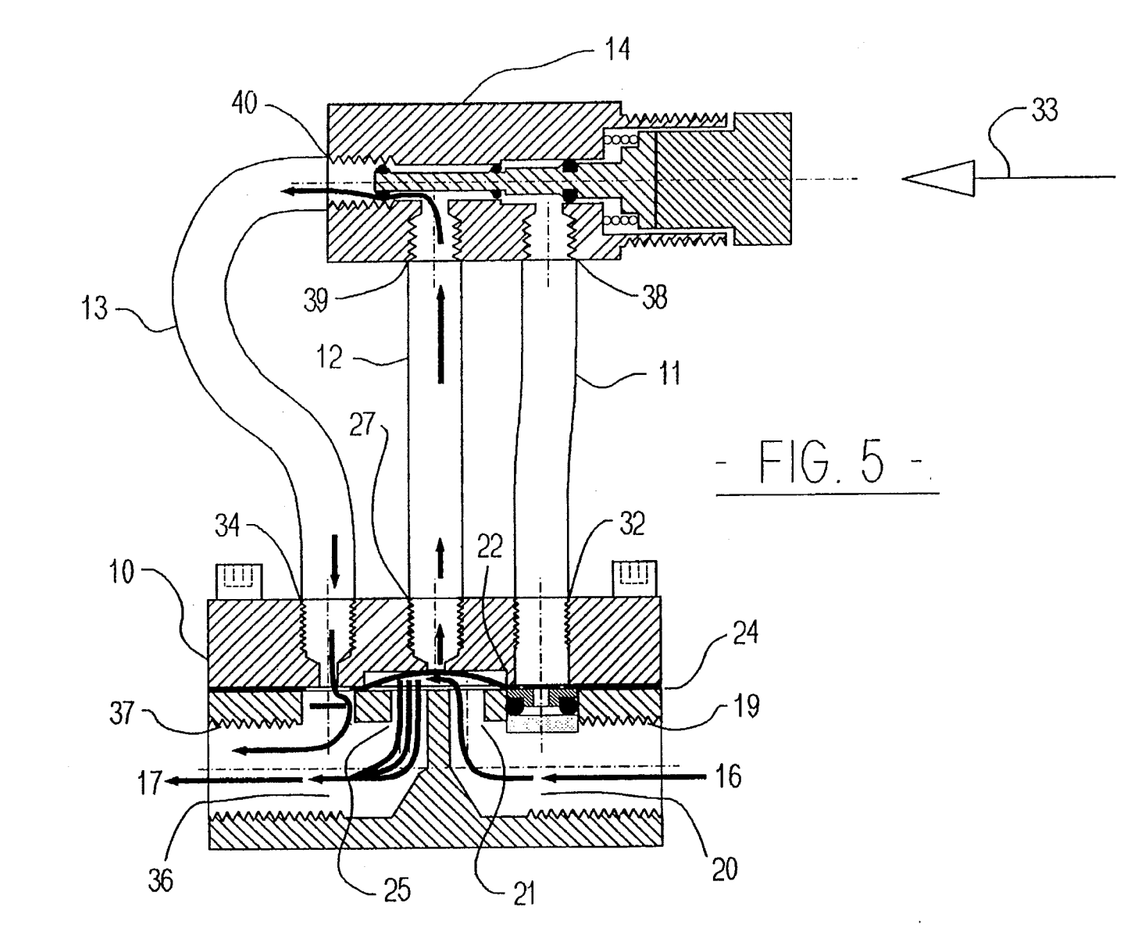
FIG. 5 is a cross-section through a conventional three-way valve and a cross-section through the control block taken along Line 5.1—5.1 of FIG. 3, representing either cold or hot flow path in the open position.
Figure 6:
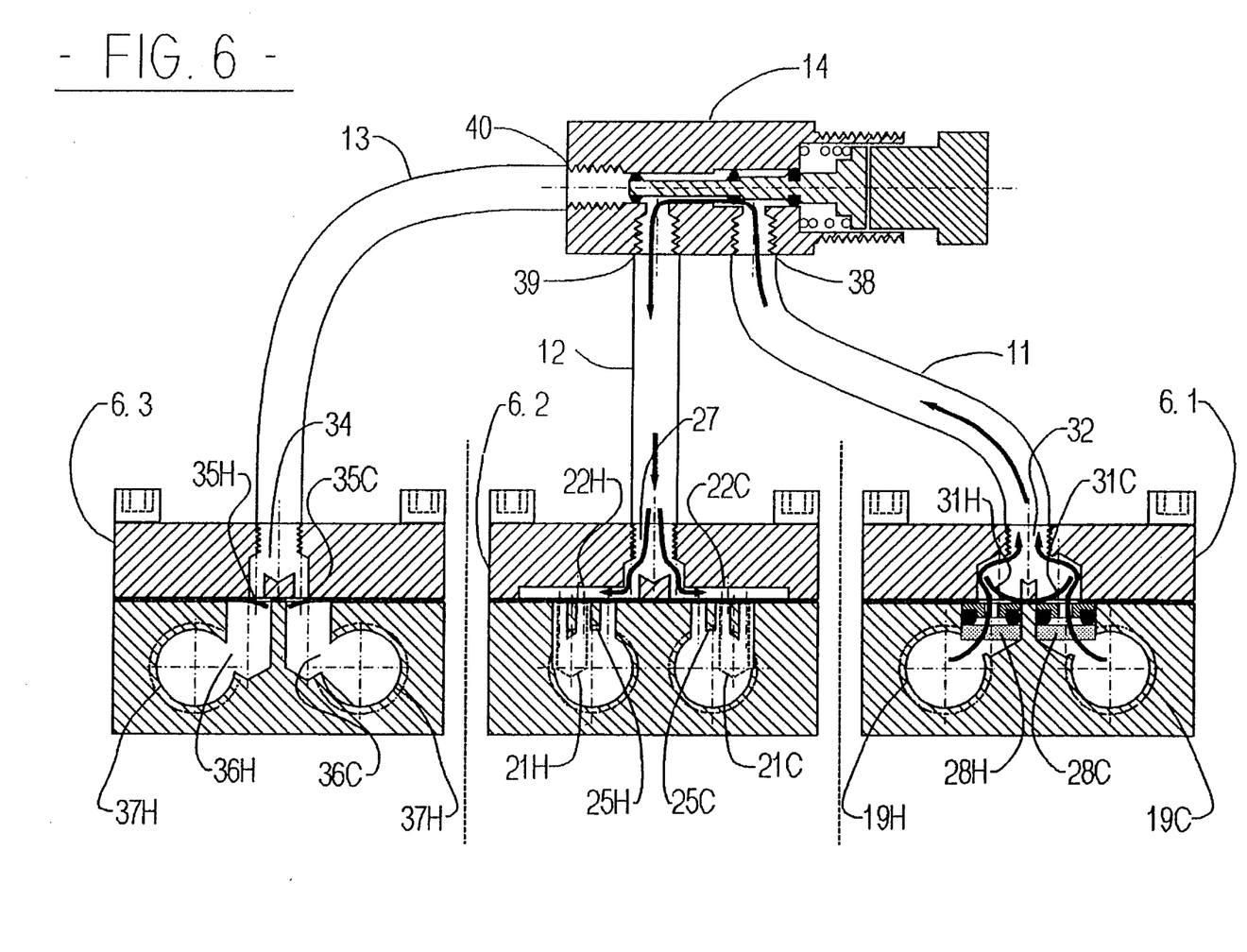
FIG. 6 is a cross-section through a conventional three-way valve and three cross-sections through the control block, in the closed position, taken along Lines 6.1—6.1, 6.2—6.2 and 6.3—6.3 respectively of FIG. 3

As shown in FIGS. 2 and 6, in the closed position of the faucet control assembly hot and cold water flow through the control block 10 is blocked by the diaphragm 24 of diaphragm gate valves 22C and 22H when sufficient pilot or operating water pressure is delivered concurrently into respective pilot water chambers 26C and 26H of the diaphragm gate valves, thereby seating portions of the diaphragm against the inlet ports 21C and 21H and outlet ports 25C and 25H. In the open position of the faucet control assembly (see also FIG. 5), pilot water pressure in the pilot water chambers 26C and 26H is vented to atmosphere, thereby unseating the diaphragm. This permits water flow between the inlet and outlet ports 21C, 21H and 25C, 25H of both diaphragm gate valves 22C, 22H. Cold and hot water can then pass through manifolds 36C and 36H and main outlet ports 37C and 37H respectively and directed through onward by known conduits to the faucet 17.

As shown in FIGS. 2, 5 and 6 pilot water pressure is controlled by the three-way valve 14, in the first position of the three-way valve (see FIG. 6), pilot water is supplied to a normally open port 34 of the three-way valve and routed through a common port 35 and the through flexible conduit 12, into a manifold port 27 from where it is diverted into the diaphragm pilot chambers 26C and 26H. Pilot water is delivered to the three-way valve from the control block 10 through pilot pressure ports 23C and 23H, filter elements 28C and 28H, port washers 30C and 30H and one way valves 29C and 29H. Cold and hot water is combined in a manifold port 32, and passes through the flexible conduit 11 to the three way valve 14.

In operation of the faucet control assembly, with reference to FIG. 2 and 5, an externally applied force 33 urges the three way valve 14 to its second position venting pilot pressure from the pilot chambers 26C and 26H of diaphragm gate valves 22C and 22H into manifold port 27 through the flexible conduit 12 and the common port 39 of the three-way valve, out the normally closed port 40 through flexible conduit assembly 13 into manifold port 34 and through one way valves 35C and 35H output manifolds 36C and 36H and main outlet ports 37C and 37H (see also FIG. 5) into the faucet 17. Thus the pilot water pressure is released to atmosphere, provided at least one valve in the faucet is set open.

In this embodiment the relative flow settings of hot and cold water valves in the typical faucet will not affect the operation of the faucet control assembly. Pilot water pressure is vented to atmosphere into either hot or cold or both portions of the faucet from the one way valves 35C and 35H. Both pairs of one way valves 31C and 31H and 35C and 35H respectively block cold and hot water cross-flow in the input and output portion respectively of the control block 10. The operation of the faucet control assembly is unaffected by variations in pressure between the hot and cold supply. The higher pressure will always be applied as the pilot pressure thereby assuring closure of the valve. Further, the incorporation of filter elements 28C and 28H in the initial pilot water flow path prevents fouling of control elements in the control block 10 and the valve 14 by water born pollutants and debris thereby reducing potential valve failure.

Various changes, adaptations and modifications may be made in the details of construction, design and layout of the above described embodiment of this invention without departing from the spirit thereof. These may include various mechanical arrangements so designed to operate the three-way valve by knee, foot or elbow, combined with various mechanical latching features for manual operation of the faucet or a push on or a push off feature. Also it may be desirable to divide the control block into separate cold and hot blocks to ease installation in some plumbing arrangements. In such an embodiment (not shown) the respective manifold ports of the separate control blocks are interconnected by appropriate conduits to the three-way valve. The control block may also be integrated in various embodiments directly into a faucet or shower assembly.

Figure 7:
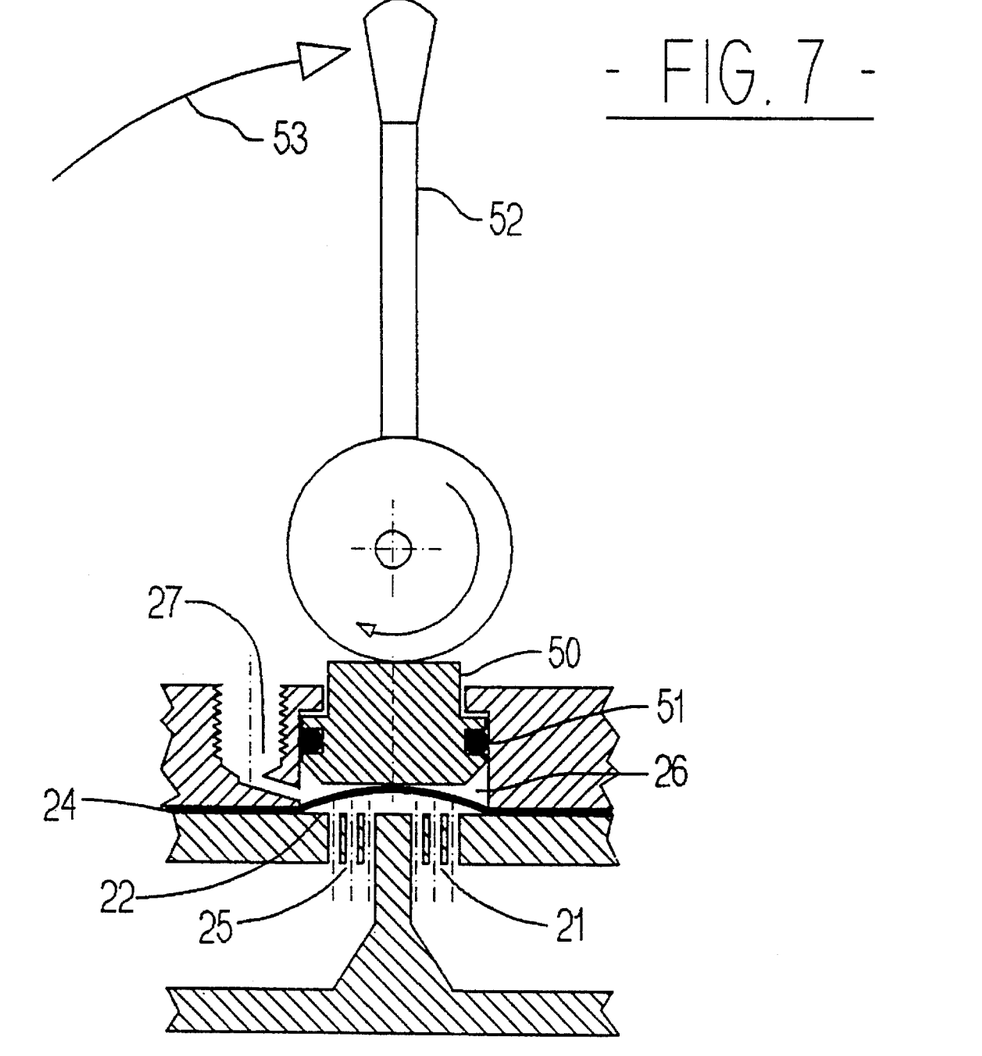
FIG. 7 is an enlarged cross-section of another embodiment of a diaphragm gate valve of a control block in accordance with the invention.

Further, it may be desirable, such as in an integrated faucet assembly to control the volume or rate of water flow through the diaphragm gates valves. This may be accomplished by a means which allows for adjusting volume of the chambers of the diaphragm gate valves thereby constricting the passage of water therethrough. One embodiment of such a means is shown in FIG. 7. The chamber 26 of the diaphragm gate valve 22 is constructed in an appropriate manner to accommodate a plunger 50 moveable within the chamber and acting upon the diaphragm 24. An "O" ring 51 is used as a means to seal the chamber from atmosphere with the application of pilot water pressure through manifold port 27 wherein the diaphragm gate valve operates as previously described. The plunger is mechanically urged by an eccentric cam lever assembly 52 to various positions when a force 53 is applied thereto variably constricting or stopping the flow of water between the inlet port 21 and outlet port 25 of the diaphragm gate valve.

It may also be desirable to use a two way valve in lieu of the three way valve 14 to vent pressure from the pilot chambers 26C and 26H of the diaphragm gate valves 22C and 22H. This can be accomplished with the addition of one or more orifices or constrictions placed in the flowpath of the pilot water circuit between the pressurized water supplies 16C and 16H and the chambers 26C and 26H of the diaphragm gate valves 22C and 22H. The use of an appropriate constriction (approximately 0.010 of a inch in diameter) creates a pressure differential between the supply pressures and atmosphere sufficient to unseat the diaphragm thereby permitting water flow through the diaphragm valve block.

The embodiments of the invention in which an exclusive property or privilege is claimed are defined as follows:

1. A control assembly for controlling the flow of water to a water outlet comprising:

a control block having first and second inlet means for respectively receiving hot and cold pressurized water from separate hot and cold pressurized water sources, first and second outlet means for respectively discharging pressurized hot and cold water to the water outlet, pilot water input means for receiving pilot water of controlled pressure, and first and second valves for respectively controlling the flow of hot and cold water from the hot and cold pressurized water sources through the control block and towards the water outlet, the first and second valves; being simultaneously moved from an open to a closed position and maintained in the closed position by the pressure of the pilot water supplied thereto through the pilot water input means;

a pilot pressure control valve for selectively controlling the pressure of pilot water supplied to the pilot water input means, the pilot pressure control valve having an intake means for receiving pressurized water from at least one of the hot and cold pressurized water sources, a discharge means for supplying pressurized pilot water to the pilot water input means, and actuator means for selectively operating the pilot pressure control valve between a first position wherein pressurized water is supplied to the input means and a second position wherein pilot water pressure present in the discharge means and, thus, the input means is release&

2. A control assembly as defined in claim 1, wherein the water outlet includes flow control means for controlling the flow of water discharged from the outlet.

3. A control assembly as defined in claim 1, wherein the water outlet includes first and second flow control means for respectively controlling the flow of hot and cold water discharged from the outlet.

4. A control assembly as defined in claim 1, wherein pilot water pressure is supplied to the pilot pressure control means from both the hot and cold pressurized water sources.

5. A control assembly as defined in claim 1, wherein the pressure of the pilot water present in the discharge means and the input means is released into at least one of the first and second outlet means.

6. A control assembly as defined in claim 2, wherein the control block, the water outlet and the flow control means are combined into one control unit.

7. A control assembly as defined in claim 3, wherein the control block, the water outlet and the first and second valve means are combined into one control unit.

8. A control assembly as defined in claim 4, wherein the control block further includes a pair of one way valves respectively positioned upstream of the pilot water input means to prevent cross-flow between the hot and cold pressurized water sources.

9. A control assembly as defined in claim 1, wherein the control block further includes a filter means for preventing fouling of elements subjected to the pilot water by water born pollutants and debris.

10. A control assembly as defined in claim 1, wherein the control block further includes a filter means for respectively preventing fouling of elements subjected to the pilot water by water born pollutants and debris.

11. A control assembly as defined in claim 1, wherein the valve of the control block is a conventional diaphragm valve.

12. A control assembly as defined in claim 1, wherein the valve of the control block is a conventional diaphragm valve.

13. A control assembly as defined in claim 11, wherein the pilot pressure control means is a three way valve.

14. A control assembly as defined in claim 12, wherein the pilot pressure control means is a three way valve.

15. A control assembly as defined in claim 11, wherein the water outlet is one of a water faucet and a shower faucet.

16. A control assembly as defined in claim 1, wherein the control block is divided into separate hot and cold water control sections, the hot water control section having the first inlet means, the first outlet means and the first valve, and the cold water control means having the second inlet means, the second outlet means and the second valve.

17. A control assembly as defined in claim 12, wherein the water outlet is one of a water faucet and a shower faucet.

18. A control assembly for controlling the flow of water to a water outlet, comprising:

a cold water control arrangement including a first intake manifold for receiving cold pressurized water from a cold pressurized water source, a first output manifold for discharging cold pressurized water to a water outlet, and a first valve for controlling the flow of cold water through the first intake and output manifolds and rewards the water outlet and having a first pilot pressure port;

a hot water control arrangement including a second intake manifold for receiving hot pressurized water from a hot pressurized water source, a second output manifold for discharging hot pressurized water to the water outlet, and a second valve for controlling the flow of hot water through the second intake and output manifolds and towards the water outlet, and having a second pilot pressure port; and a pilot pressure control means for selectively controlling the pressure of pilot water supplied to the first and second pilot pressure ports, the pilot pressure control means having an intake means for receiving pressurized water from at least one of the hot and cold pressurized water sources, a discharge means for supplying pressurized pilot water to the first and second pilot pressure ports, a pilot pressure valve for controlling fie pilot water pressure in the discharge means, and an actuator means for selectively operating the pilot pressure valve between a first position wherein pressurized water is supplied through the discharge means to the first and second pilot pressure ports and a second position wherein the pressure of pilot water present in the discharge means is released; the first and second valves being simultaneously moved from an open to a closed position and maintained in the closed position by the pressure of the pilot water supplied thereto from the pilot pressure control means and through the respectively associated one of the fast and second pilot pressure ports.

\* \* \* \* \*

UNITED STATES PATENT AND TRADEMARK OFFICE
CERTIFICATE OF CORRECTION

PATENT NO. : 5,505,227
DATED : April 9, 1996
INVENTOR(S) : Peter A. Pubben It is certified that error appears in the above-identified patent and that said Letters Patent is hereby corrected as shown below:

On title page, item [56]
Insert Missing references as follows:

```
3,536,294   10/27/90   Rodriguez  ............... 251/41
3,638,310   02/01/72   Austin, Jr. .............. 32/22
4,052,035   10/04/77   Kenny et al .............. 251/14
5,029,806   08/09/91   Huo-Lien et al ........... 251/14
```

Col. 5, line 4, Claim 1, after "valves" delete ";" (semi-comma);

Col. 5, line 20, Claim 1, after "release " delete "&" (ampersand) and insert -- d. --.    Col. 6, line 25, Claim 18, delete "rewards" and substitute therefor ---towards---; Col. 6, line 53, Claim 18, delete "fast" and substitute therefor ---first--

Signed and Sealed this

Thirty-first Day of December, 1996

Attest:

BRUCE LEHMAN

*Attesting Officer*          *Commissioner of Patents and Trademarks*